United States Patent [19]
Andrews

[11] Patent Number: 5,363,126
[45] Date of Patent: Nov. 8, 1994

[54] DEVICE AND APPARATUS FOR HIGH SPEED TRACKING IN A RASTER OUTPUT SCANNER

[75] Inventor: John R. Andrews, Fairport, N.Y.
[73] Assignee: Xerox Corporation, Stamford, Conn.
[21] Appl. No.: 951,286
[22] Filed: Sep. 25, 1992
[51] Int. Cl.⁵ .............................................. G01D 9/42
[52] U.S. Cl. .................................... 346/108; 359/40
[58] Field of Search ............... 359/40, 41; 346/108, 346/160; 358/481, 493; 250/236

[56] References Cited

U.S. PATENT DOCUMENTS

| | | | |
|---|---|---|---|
| 3,654,624 | 4/1972 | Becker et al. | 346/108 |
| 3,657,707 | 4/1972 | McFarland et al. | 346/108 |
| 3,843,231 | 10/1974 | Borel et al. | 350/160 LC |
| 4,170,028 | 10/1979 | DeBenedictis et al. | 358/285 |
| 4,230,394 | 10/1980 | Brueggemann et al. | 350/6.8 |
| 4,247,160 | 1/1981 | Brueggemann | 350/6.8 |
| 4,441,126 | 4/1984 | Greenig et al. | 358/293 |
| 4,559,562 | 12/1985 | Kramer | 358/208 |
| 4,613,877 | 9/1986 | Spencer et al. | 346/160 |
| 4,767,190 | 8/1988 | Dir et al. | 359/40 |
| 4,877,310 | 10/1989 | Seachman et al. | 359/40 |
| 4,958,914 | 9/1990 | Owechko et al. | 350/342 |
| 5,018,835 | 5/1991 | Dorschner | 350/336 |
| 5,093,674 | 3/1993 | Storlie | 346/108 |
| 5,132,826 | 7/1992 | Johnson et al. | 359/93 |
| 5,159,351 | 10/1992 | Hotomi et al. | 346/108 |

Primary Examiner—Benjamin R. Fuller
Assistant Examiner—Randy W. Gibson
Attorney, Agent, or Firm—Denis A. Robitaille

[57] ABSTRACT

An optical element for laser beam deflection in a raster output scanner (ROS) of an electrophotographic printer. The optical element includes a chamber containing a ferroelectric liquid crystal material having a variable index of refraction as a function of voltage applied thereacross. The ROS includes a control system coupled to a voltage source for applying a voltage across the optical element to control the variable index thereof in conjunction with the rotation of the polygon, facet alignment errors and/or belt motion errors to provide high speed tracking of a light beam.

21 Claims, 6 Drawing Sheets

DEVICE AND APPARATUS FOR HIGH SPEED TRACKING IN A RASTER OUTPUT SCANNER

This invention relates generally to a raster output scanning system for producing electrostatic latent images from electronically stored data in, for example, an electrostatographic printing machine and, more particularly, concerns a device and apparatus for providing controlled high speed tracking and laser scan correction in a raster output scanner.

The basic reprographic process used in an electrostatographic printing machine generally involves an initial step of charging a photoconductive member to a substantially uniform potential. The charged surface of the photoconductive member is thereafter exposed to a light image of an original document to selectively dissipate the charge thereon in selected areas irradiated by the light image. This procedure records an electrostatic latent image on the photoconductive member corresponding to the informational areas contained within the original document being reproduced. The latent image is then developed by bringing a developer material including toner particles adhering triboelectrically to carrier granules into contact with the latent image. The toner particles are attracted away from the carrier granules to the latent image, forming a toner image on the photoconductive member which is subsequently transferred to a copy sheet. The copy sheet having the toner image thereon is then advanced to a fusing station for permanently affixing the toner image to the copy sheet in image configuration.

The approach utilized for multicolor electrostatographic printing is substantially identical to the process described above. However, rather than forming a single latent image on the photoconductive surface in order to reproduce an original document, as in the case of single color printing, multiple latent images corresponding to different color separations are sequentially recorded on a photoconductive surface. Each single color electrostatic latent image is developed with toner of a color complimentary thereto and the reprographic process described above is repeated for each of the differently colored images with a respective toner of complimentary color. Thereafter, each single color toner image is transferred to the copy sheet in superimposed registration with the prior toner image, creating a multi-layered toner image on the copy sheet. Finally, this multi-layered toner image is permanently affixed to the copy sheet to form a finished color copy.

Electrostatographic printing machines have increasingly utilized digital electronics technology to produce output copies from input video data representing original image information. In this case, it is known to use a raster output scanner (ROS) for exposing the charged portions of the photoconductive member to record the electrostatic latent image thereon. Generally, the ROS has a laser for generating a collimated beam of monochromatic radiation. The laser beam is modulated in conformance with the image information and is directed toward the surface of the photoconductive member through an optics system to form the desired image on the photoconductive member. In the optics system, the modulated laser beam is transmitted through a lens or a series of lenses onto a scanning element, typically a rotating polygon having mirrored facets, such that the light beam is reflected from a facet through post-polygon optics and focused to a "spot" on the photoconductive member. The rotation of the polygon causes the spot to scan linearly across the photoconductive member in a fast scan (i.e., scan line) direction. Meanwhile, the photoconductive member is advanced in a process direction orthogonal to the scan line direction and relatively more slowly than the rate of the fast scan, the so-called slow scan direction. In this manner, the modulated laser beam is scanned across the recording medium as an array of scan lines in a raster scanning pattern. The light beam is intensity-modulated in accordance with an input image serial data stream at a rate such that individual picture elements of the image, called pixels, represented by the data stream are exposed on the photosensitive medium as a series of parallel lines to form the latent image. The photosensitive medium is a drum or a belt which should be aligned so that these parallel lines are formed perpendicular to the direction of belt travel.

In a single pass color electrophotographic printing system, a plurality of ROS stations are selectively energized to create successive image exposures, each corresponding to the three primary colors. A fourth ROS station may also be added if black images are to be created as well. Thus, each image area on the photoconductive member makes at least three passes relative to an image scan line formed by the modulated laser beam of the ROS system to create a color output copy. Alternatively, highlight color applications might use black plus one or two colors. Each developed image is eventually superimposed onto one another in a manner such that each color image must be registered in both the photoreceptor process direction (slow scan direction) and in the direction transverse to the process direction (fast scan direction). In practice, each pixel must be measured to within a 0.1 mm circle or within a tolerance of ±0.05 mm. Thus, if a number of developed raster scan lines are superimposed on a sheet, as in a color copier, individual scan line positioning is a critical aspect with respect to creation of acceptable copy quality. In many printing machines, the sampling rate of the slow scan direction data equates to 300 lines per inch or more. It has been shown that errors in the slow scan direction of as small as 1% of the nominal line spacing may be perceived in a half tone or continuous tone image. This implies a need for a high degree of control in positioning the scan line on the image plane, especially in such applications as multiple beam and multiple ROS color printers where a plurality of scan lines are written onto a single photoreceptor.

In raster output scanners of the type employing an optical system including a rotating polygon having a plurality of facets for imparting scanning movement to a laser beam, an important and, indeed critical, factor is the intensity and uniformity of the scanning beam produced thereby. Ideally, a uniform illumination intensity is desired across the scan line length since variations in illumination intensity may result in poor copy quality. As a general rule, a polygonal scanning element is rotated at an essentially constant angular velocity so that its facets sequentially intercept and reflect an input light beam. Conventional raster output scanners employing a rotating multi-faceted polygon generally utilize a specific illumination procedure for preventing the illumination of the active scanning facet from varying as a function of the rotation of the scanning element. In a first type of illumination procedure, the so-called over-filled mode, the beam which is transmitted onto the facet is made larger than the individual facets of the polygon so as to cover at least two or more adjacent facets simultaneously. The over-filled mode is discussed in detail, for example, in U.S. Pat. No. 3,995,110 and has been used with substantial commercial success, such as in the Model 9700 electronic printing system manufactured by Xerox Corporation. However, over-filled mode raster output scanners suffer from the disadvantage of having low power efficiency in that a substantial part of the available optical energy is lost due to the inherent truncation of the the input beam caused by spreading the laser beam to fill several facets. Further, in such over-filled mode systems, resolution of the beam on the imaging surface is determined by the facet size. Moreover, such over-filled mode systems are generally very expensive.

As a corollary to the over-filled mode system, the laser beam may be adjusted to have a smaller cross-sectional area than the cross-sectional area of the facet of the polygon, a so-called under-filled mode system. In this arrangement, all of the laser power is available for use during the scanning operation, thereby eliminating the low power efficiency problem of the over-filled facet mode. However, underfilled mode systems, as disclosed, for example, in U.S. Pat. Nos. 3,675,016 and 3,750,189, exhibit a facet changeover problem wherein the beam cannot be effectively used during the time that a facet intersection is passing through the laser beam.

The disadvantages of the underfilled and overfilled mode raster output scanners has led to the concept of "facet tracking" in which an appropriate shifting structure is used for causing the laser beam to follow the active deflecting facet as it rotates. In such facet tracking systems, the laser beam remains fully on the active deflecting facet for a period of time at least equal to the duration of the scan across the imaging member. Exemplary facet tracking systems known in the prior art are disclosed in U.S. Pat. Nos. 3,910,657 and 4,230,394.

Facet tracking systems have tended to be relatively complex and generally require numerous components so that the input beam can be fully seated on the scanning facet while the reflected beam is being scanned through a desired scan angle. However, most facet tracking systems are inherently mechanically unstable due to the use of multiple rotating members and are therefore not desirable for use in high speed, high resolution applications. The following disclosures appear to be relevant:

U.S. Pat. No. 4,170,028 Patentee: DeBenedictis et al. Issued: Oct. 2, 1979

U.S. Pat. No. 4,230,394 Patentee: Brueggemann et al. Issued: Oct. 28, 1980

U.S. Pat. No. 4,247,160 Patentee: Brueggemann Issued: Jan. 27, 1981

U.S. Pat. No. 4,958,914 Patentee: Owechko et al. Issued Sept. 25, 1990

U.S. Pat. No. 5,132,826 Patentee: Johnson et al. Issued: Jul. 21, 1992

The relevant portions of the aforementioned disclosures are summarized as follows:

U.S. Pat. No. 4,170,028 discloses a method and apparatus for improving the efficiency of laser scanning systems using a multi-faceted rotating polygon as the scanner device by utilizing an acousto-optic cell as an active optical element to both modulate and deflect an incident laser beam so that the modulated beam is caused to follow one facet of the scanner during a complete scan.

U.S. Pat. No. 4,230,394 discloses an all mirror facet tracking system including first and second spherical mirrors wherein both of the mirrors can be located along the same system axis on opposite sides of a rotating multi-faceted polygon which has its axis of rotation on the system axis. These spherical mirrors are located along orthogonal system axis and a flat folding mirror is provided between the two spherical mirrors to reduce the angle of incidence of the chief ray with the second spherical mirror thereby providing an apparatus for increasing the reliability of a laser scanning system utilizing a multi-faceted polygon as the scanner.

U.S. Pat. No. 4,247,160 discloses a laser beam scanner with wobble correction to minimize scan-to-scan spot position errors due to angular alignment errors in the cross scan plane between adjacent facets of a scanning polygon. The laser beam scanner has a positive cylinder mirror having power in the cross scan plane but no power in the scan plane for minimizing scan-to-scan spot position error.

U.S. Pat. No. 4,958,914 discloses an optical intensity-to-position mapping and light deflector apparatus and method wherein a liquid crystal prism is used to deflect a light beam. Voltage gradients are varied in accordance with optical intensity at corresponding locations in the received light to correct any optical variations at that particular location. The prism of that patent deflects higher intensity light more than lower intensity light.

U.S. Pat. No. 5,132,826 discloses a ferroelectric liquid crystal tunable filter employing bi-stable smectic ferroelectric liquid crystals.

Each of these various prior art schemes for laser beam scanning has disadvantages and/or shortcomings. For example, the use of precision optics requires not only high quality optical elements, but also tight control in the positioning of those optics in order to obtain the requisite very precise mechanical control sufficient to adjust spot position as required in many cases. High quality optical elements are also relatively expensive and require a correspondingly accurate high frequency signal generator and related electronics to produce and maintain quality scan beam positioning. Further, such systems which incorporate feedback circuits to provide mechanical reorientation of rotating or translating mirrors generally operate too slowly to correct for motion quality errors because mirror components are relatively bulky and are difficult to move precisely and quickly.

According to the present invention, an optical element for selective deflection of a light beam is provided, comprising a member including a pair of prism elements positioned substantially adjacent one another to form a chamber interposed therebetween, wherein the chamber has a progressively decreasing width from one marginal region to another marginal region opposed therefrom and a material having a variable index of refraction is provided so as to substantially fill the chamber of the member.

According to another aspect of the present invention, a raster output scanner adapted to illuminate a surface is provided, comprising means for generating a light beam modulated in accordance with a video input data signal, a rotatably mounted scanning polygon positioned to receive the light beam having a plurality of facets for reflecting the light beam onto the surface to provide successive scan lines, an optical element interposed between the light beam generating means and the rotatably mounted scanning polygon for selectively deflecting the light beam onto a selected portion of each facet as the facet rotates, and means for electrically biasing the optical element to selectively deflect the light beam as a function of the biasing voltage applied to the optical element so as to position the light beam on the selected portion of each facet.

According to yet another aspect of the present invention, there is provided an electrostatographic printing machine of the type in which a raster output scanner produces a modulated light beam wherein the modulated light beam is scanned across a movable photoconductive surface by a rotatable scanning polygon having a plurality of facets for recording successive scan lines on the photoconductive surface, comprising an optical element for deflecting the light beam onto each facet as the polygon rotates to form a scan line and a voltage source for applying a biasing voltage to the optical element to deflect the light beam as a function of the biasing voltage applied to said optical element so as to position the light beam on the selected portion of each facet.

Other features of the present invention will become apparent as the following description proceeds and upon reference to the drawings in which.

While the present invention will hereinafter be described in connection with a preferred embodiment thereof, it will be understood that this description is not intended to limit the invention to that embodiment. For example, although the invention is described with respect to a multi-color xerographic machine, the facet-tracking and wobble correction provided by the invention could also be incorporated into a black and white machine. Thus, it is intended that the present description of the invention cover all alternatives, modifications, and equivalents as may be included within the spirit and scope of the invention as defined by the appended claims.

Figure 8:
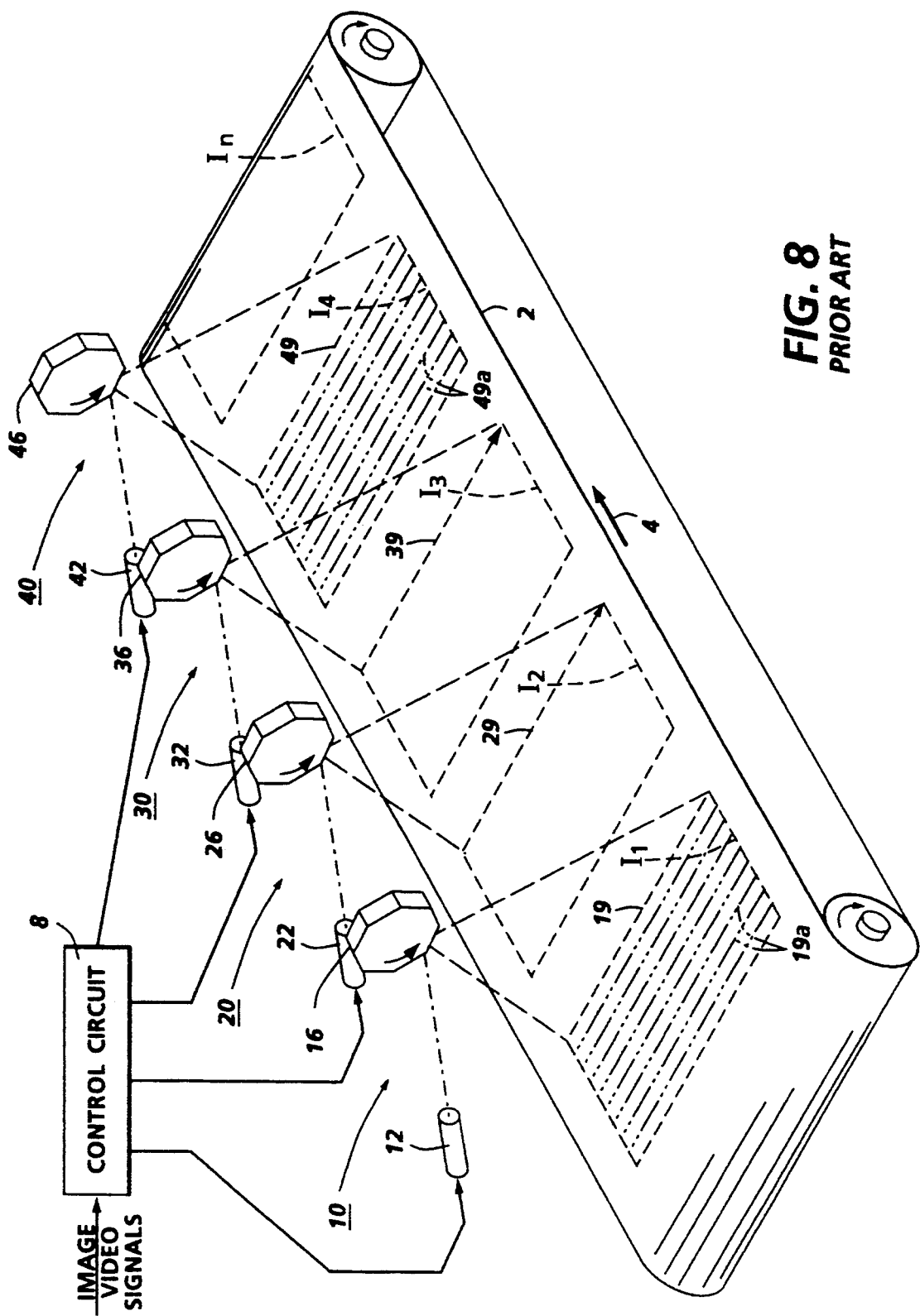
FIG. 8 shows a schematic perspective view of a prior art, single pass, multiple ROS system for forming a multicolor image in an electrostatographic printing machine.

Referring initially to FIG. 8, before describing the invention in detail, there is shown a prior art, single pass, ROS multicolor printing system having four ROS systems, 10, 20, 30, and 40. The multicolor printing system includes a photoreceptor belt 2, driven in a process direction, indicated by the arrow 4. The length of the belt 2 is designed to accept an integral number of spaced image areas, $l_1$–$l_n$, represented by dashed line rectangles. Each image area has an associated charging station (not shown) which places a predetermined electrical charge on the surface of belt 2. Each image area $l_1$–$l_n$ is exposed successively by ROS systems 10, 20, 30, 40, respectively. As each of the image areas $l_1$–$l_n$ reaches a transverse line of scan, represented by lines 19, 29, 39, 49, the image area is progressively exposed on closely spaced transverse raster lines, shown generally with exaggerated longitudinal spacing as reference numerals 19a and 49a on the image areas $l_1$ and $l_4$, respectively.

Downstream from each exposure station, a development station (not shown) develops the latent image formed in the associated image area. A fully developed color image is then transferred to an output sheet. Details of charge and development xerographic stations in a multiple exposure single pass system are disclosed, for example, in U.S. Pat. No. 4,660,059, the contents of which are hereby incorporated by reference.

Each ROS system 10, 20, 30, and 40 contains its own scanning components of the type herebefore described in the art. For purposes of simplicity, each ROS system 10, 20, 30, 40 is shown as having two components, namely, a laser light source 12, 22, 32, 42 and a rotating polygon 16, 26, 36, 46, respectively. It will be appreciated by those of skill in the art that multiple scan lines may also be generated with a single ROS. An exemplary ROS system 10, includes a gas, or preferably, diode laser light source 12, having an output which is modulated by signals from control circuit 8, which output is optically processed to impinge on the facets of rotating polygon 16. Each facet reflects the modulated incident laser beam as it is rotated to produce a scan line which is focused at the photoreceptor surface 2. Control circuit 8 contains the circuit and logic modules which respond to input video data signals and other control and timing signals to operate the photoreceptor drive in synchronism with the image exposure and to control the rotation of the polygon 8 by a motor (not shown). The other ROS systems 20, 30, 40, have their own associated laser diodes 22, 32, 42, and polygons 26, 36, 46, respectively.

Figure 1:
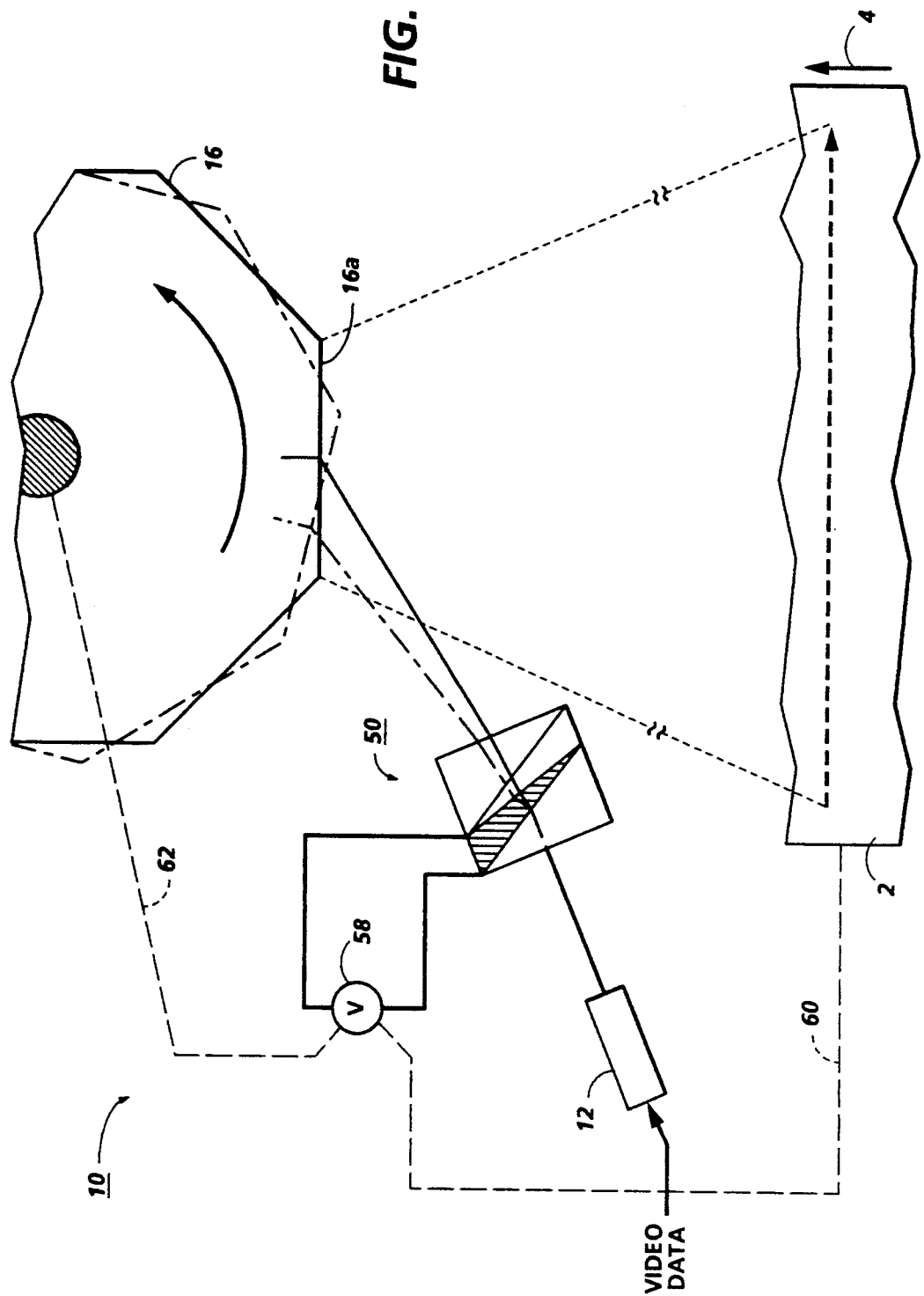
FIG. 1 shows a plan view of the general optical configuration of a Raster Output Scanner (ROS) system, showing an optical element according to the present invention disposed in the pre-scan optical path.

A more detailed description of a ROS system used, for example, in an electrostatographic printing machine will be provided with reference to FIG. 1 which shows a general configuration of the optical system and the optical path of a ROS. For purposes of the present discussion, a single ROS system will be described in detail with reference to ROS system 10. It will be understood that each ROS system 20, 30, 40 may comprise similar components or may include other components, as the case may be. Initially, input video data is transmitted to the laser source 12 which embodies a self-modulating light source for producing a modulated diverging beam of coherent light. The beam may be collimated by a spherical or an aspherical collimating lens and then refocused by a cylindrical lens as appropriate. The beam is next incident upon a rotating polygon 16 having at least one mirrored facet 16a for reflecting the beam through a post scan optics system. Other suitable devices for scanning are known in the art, including rotating holograms, rotating diffraction gratings, etc. The post scan optics system reconfigures the beam reflected by facet 16a to a circular or elliptical cross-section, refocuses the beam to the proper point on the surface of photoreceptor/drum 2, and corrects for scan nonlinearity (f-theta correction). A recollimating lens and a toroidal or cylindrical lens may also be disposed between the scanning device 16 and the photoreceptor 2 to provide magnification or other optical manipulation where appropriate.

In the exemplary embodiment shown in FIG. 1, the laser scan path is shown as a single beam (for illustrative purposes only), wherein the rotation of a mirrored facet 16a causes the reflected beam to be deflected and thereby scanned across a photosensitive image member or the photoreceptor belt 2. Thus, if polygon 16 is rotated in a counterclockwise fashion, as shown, a beam reflected from one of its moving facets 16a will be caused to scan from right to left on the photoreceptor belt 2. Polygon 16 is preferably driven by a motor (not shown) through a shaft, with the angular velocity of the polygon 16 synchronized with the angular velocity of belt 2. The combination of the rotation of polygon 16 with movement of the photoreceptor belt 2 in the direction as shown by arrow 4, causes scanning to proceed in a raster manner generating an image formed by an array of scan lines. A typical ROS can illuminate the charged portion of drum 2 at a rate of about 600 pixels per inch; e.g. at 600 spi resolution.

The optical system described hereinabove discloses the basic elements of a raster output scanning system as is well known in the art. In accordance with the present invention and as shown in FIG. 1, an additional optical element 50 is provided and disposed in the pre-scan optics, prior to polygon 16. Optical element 50 deflects the laser beam in order to track a moving facet, for example facet 16a, of the polygon before being reflected to form a scan line on the imaging member 2. This function is shown illustratively in FIG. 1 where a light beam tracks the center spot of facet 16a as the facet rotates in a counterclockwise direction.

Optical element 50 preferably includes a chamber or cell for containing a ferroelectric liquid crystal material as is generally known in the art. Ferroelectric liquid crystal materials and the physics and operations thereof have been described extensively, as for example, in U.S. Pat. No. 4,563,059, as well as by Anderson et al., Appl. Phys. Lett. 51:640 (1987), the contents of which are incorporated by reference herein. In such materials, the speed of light therethrough depends upon the orientation of an electric field vector with respect to the transmitting material such that the angle of refractance of light passing therethrough can be varied by applying an electric field across a cell containing ferroelectric liquid crystal material, the so-called electroclinic effect. A number of chiral smectic A* materials have been shown to display an electroclinic effect when incorporated into a ferroelectric type cell wherein an applied voltage induces or varies the tilt angle in these materials in an analog fashion. It will be understood that other liquid crystal materials may be utilized, such as parallel aligned nematic liquid crystal materials. However, the ferroelectric smectic A* is preferred due to its very fast response time, on the order of less than 100 ns.

The optical element 50 of the present invention provides a device for laterally moving the input beam to polygon 16 in conjunction with the rotating facets thereof for deflecting the beam on a selected portion of each facet as the polygon 16 rotates by utilizing the electroclinic effect of ferroelectric liquid crystal materials. The present invention provides the advantages of a facet tracking system while eliminating the major facet tracking systems drawback of system complexity due to the number of additional components typically required for such system. Thus, in accordance with the present invention, optical element 50 is placed in the scan path of a ROS immediately prior to the rotating polygon 16. The optical element 50 defines a chamber adapted to contain a volume of ferroelectric liquid crystal material therein. By applying a biasing voltage to the optical element 50, a combination of electrical fields are generated across the chamber to produce a condition in which the molecules of the ferroelectric material in the chamber are aligned in a generally uniform direction with respect to the magnitude of the voltage applied to the optical element 50, thereby varying the refractive index of the optical element and allowing the beam transmitted therethrough to be deflected at an angle with respect to the magnitude of the biasing voltage.

Figure 2:
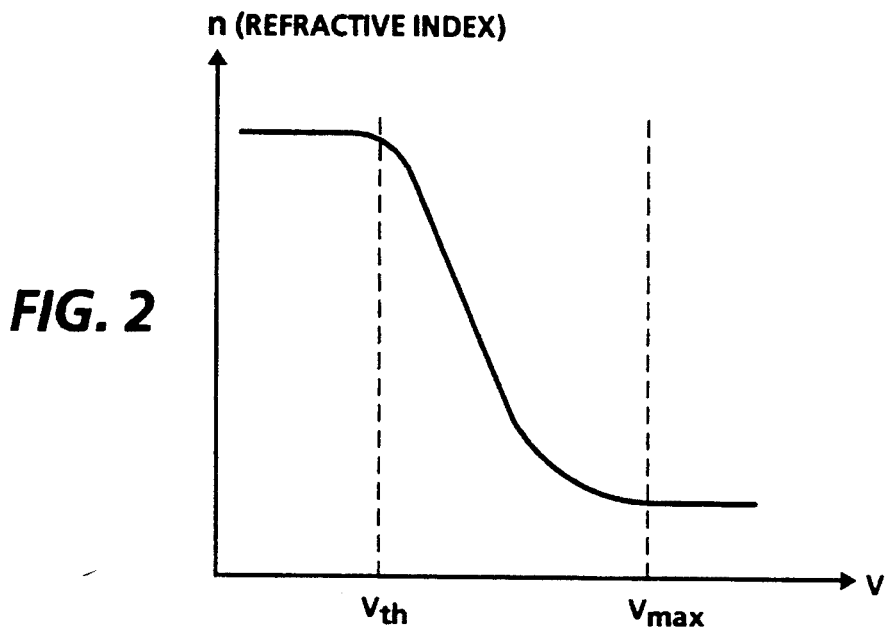
FIG. 2 shows a graphic representation of the relationship between the index of refraction and the voltage applied to a ferroelectric liquid crystal material as utilized in the present invention.

The manner in which the refractive index of the ferroelectric liquid crystal material varies in response to the biasing voltage is shown in FIG. 2. As shown in FIG. 2, the refractive index $n_e$ of the ferroelectric material can be freely controlled for light polarized either parallel or perpendicular to the alignment direction of the ferroelectric liquid crystal material by varying the magnitude of the biasing voltage. That is, when the level of the biasing voltage exceeds the threshold value $V_{th}$, the arrangement of the liquid crystal molecules will change from homogeneous toward homeotropic and the refractive index $n_e$ will also change with respect to the voltage. Thus, as the biasing voltage applied to the optical element 50 is varied, the refractive index of the liquid crystal material changes, thereby changing the angle at which the laser beam exits the optical element 50. This angle is continuously variable within the limits set by the available change in the refractive index.

Typically, a ferroelectric liquid crystal cell is made up of parallel plates which form a liquid crystal layer of uniform thickness therebetween. Such liquid crystal cells are known in the art and have been described variously, as for example, in U.S. Pat. No. 4,563,059 and the references cited therein, the contents of which are incorporated herein by reference. In standard practice, liquid crystal cells of the type disclosed are used to achieve specific electro-optic effects by placing a small amount of a specific ferroelectric liquid crystal material between two glass plates. For a range of angles of incidence on the liquid crystal interface, light is partially deflected, depending on the electric field orientation of the optic axis in the ferroelectric material. Such liquid crystal cells are often used to alter polarization of a light passing therethrough so as to provide an intensity modulation device or a wavelength tuner.

Figure 3:
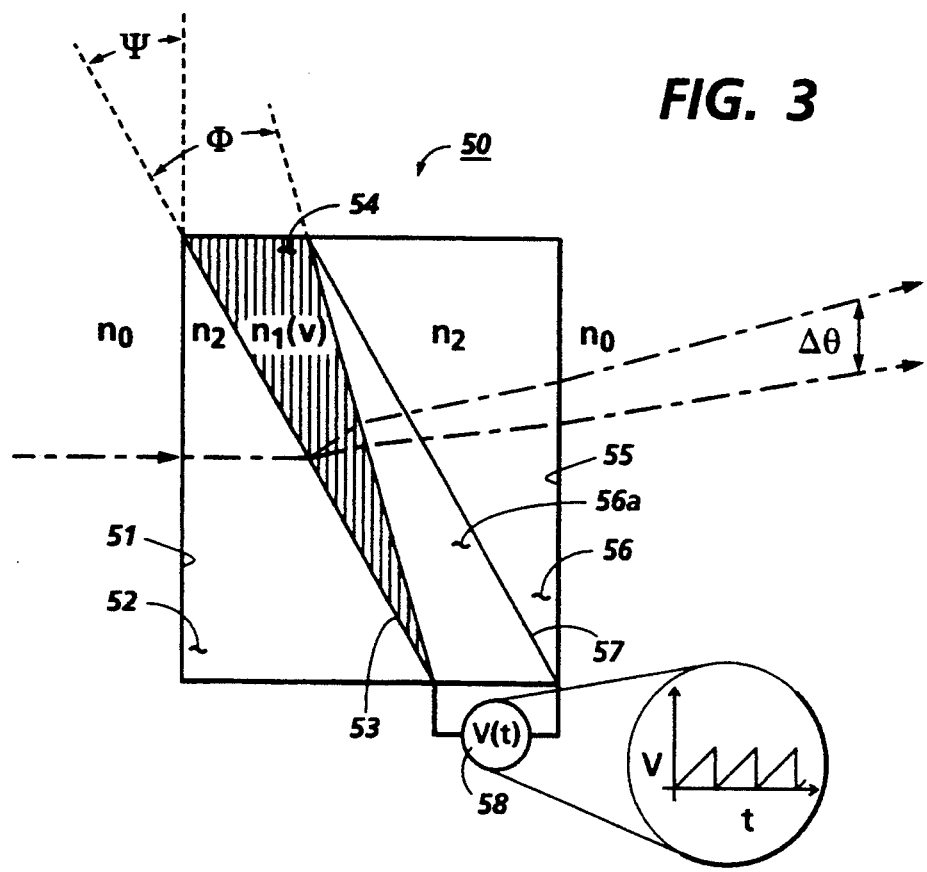
FIG. 3 shows a schematic side view of an optical element in accordance with the present invention.

FIG. 3 shows, in schematic form, a side-view of a preferred embodiment of the optical element 50 in accordance with the present invention. The specific configuration of the optical element 50 provides a chamber 54 interposed between two prisms 52, 56 having substantially planar parallel external surface 51, 55, respectively. The prisms comprise glass or some other optically transmissive materials. One of the prisms, in this case prism 56, is coated with a transparent dielectric material having an increasing thickness, forming a dielectric region 56a and defining the shape of the chamber between the two prisms 52, 56 for containing the ferroelectric liquid crystal material. The dielectric region could be made, for example, by dip coating the prism 56 at a linearly varying rate, by an etching process or by a shadow masked coating process. Alternatively, grinding, molding, casting or other well known fabrication methods using a particular light transmissive material can be used.

The optical element of the present invention is fabricated by positioning the two prisms 52, 56 such that the exterior surfaces 51, 55 remain parallel to one another on opposite sides of a cube, forming a chamber 54 therebetween having a triangularly shaped cross-section such that the thickness of the chamber varies on a plane perpendicular to the laser beam path therethrough. It will be understood that the triangularly shaped face of the chamber can be truncated so that the chamber 54 can be given a substantially trapezoidal profile, having a progressively decreasing width from one marginal region to another marginal region opposed therefrom in the same plane. The chamber 54 is then filled with the ferroelectric liquid crystal material, as for example, a commercial liquid crystal material BDH 764E available from EM Industries of Hawthorne, N.Y., having a refractive index ranging from 1.586 to 1.600 over the range of 0 to 30 volts applied to the cell. The chamber configuration defined by the present invention results in a structure that provides angular deflection of a light or laser beam passing therethrough. Since the chamber 54 contains a ferroelectric liquid crystal material having a variable index of refraction with respect to voltage applied thereto, changing the voltage applied to the optical element 50 also results in a change in the angular deflection of the laser beam.

Conductive electrodes 53 and 57 are provided for applying a biasing voltage across the chamber 54 of optical element 50. In FIG. 3, transparent conductive electrodes 53 and 57 are embedded into the prisms 52 and 56. It is an important feature of the present invention that the electrodes are positioned parallel to one another in order to create uniform electric fields across the chamber 54. That is, due to the biasing voltage applied to the electrodes 53, 57 by voltage source 58, electrodes 53 and 57 generate uniform electric fields across the chamber 54 to induce reorientation of the molecules in the chamber 54 and thereby control the refractive index thereof. While it may be possible to place the liquid crystal material between two glass plates that are angularly positioned with respect to one another, the parallel configuration of the electrodes described by the present invention provides the capability to maintain a uniform electric field between the electrodes 53, 57 when a biasing voltage is applied thereto. This uniform electric field permits for the creation of a uniform refractive index across the chamber 54. For ferroelectric liquid crystals, a typical thickness of between 2-4 micrometers will suffice.

The qualitative aspects of the electro-optic effect provided by the optical element of the present invention can be explained by a simple application of Snell's Law:

$$N_i \sin\theta = N_i' \sin\theta_i'$$

In the present analysis, Snell's Law must be applied four times at the air/glass interface along exterior face 51, at the glass/liquid crystal interface between plate 52 and chamber 54, at the liquid crystal/glass interface between chamber 54 and plate 56, and the glass/air interface along exterior face 55 in order to determine the aggregate angle of refraction for light rays passing through the optical element 50. For simplicity, it is assumed that the material making up the dielectric region 56a has a refractive index similar to the glass substrate. However, it will be recognized by those of skill in the art that the dielectric region 56a may be composed of a material having a unique refractive index independent of that of the substrate making up the plates of the optical element 50.

It will be appreciated that calculations based on Snell's Law will yield an output angle as a function of the input angle and the refractive index of the flat plate material as well as the variable refraction of the liquid crystal material in the chamber 54. In a typical application, the angular range covered by varying the voltage applied to the liquid crystal cell is in the range of 1 to 1.5 degrees. This angular range can be increased substantially for larger angles of incidence. Likewise, smaller angular ranges can be provided by reducing the wedge dimensions and/or by reducing the refractive index change attainable with the liquid crystal material.

Figure 4:
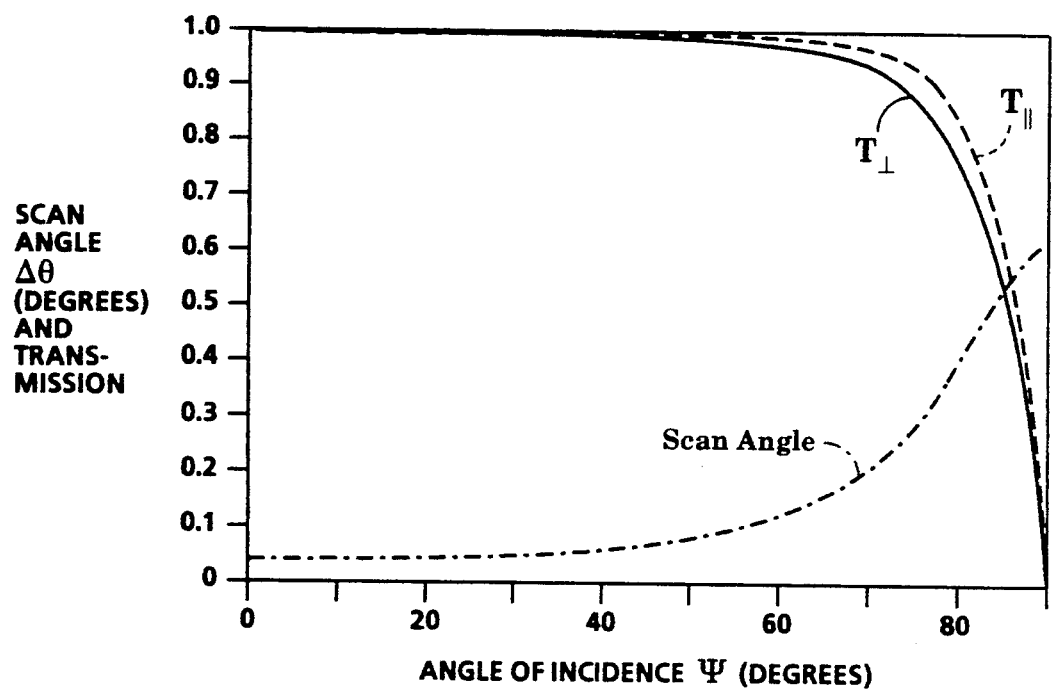
FIG. 4 shows a numerical model of the expected scan angle relative to the variable index of refraction in the optical element of the present invention.

As previously discussed, FIG. 3 shows a schematic view of the liquid crystal chamber 54 in between the faces of two prisms 52, 56 in accordance with the present invention. This geometry of this device is important because it allows tilting of the prisms to high angles of incidence while suffering minimal reflection losses. The wedge angle $\Phi$, the tilt angle $\Psi$, and the scan angle $\Delta\theta$ are shown in FIG. 3. Numerical modeling of the expected scan angle of the prism has been done for the expected change in refractive index, discussed above. The results of the model are shown in FIG. 4, for the geometry shown in FIG. 3, and for a liquid crystal cell having a wedge angle $\Phi$ of 2.86. Here the scan angle $\Delta\theta$ and the transmission rate in ambient air are shown as a function of the prism tilt angle $\Psi$. The scan angle increases substantially with the tilt angle of the prism, as can be seen. As an example, at a tilt angle of about 70°, the scan angle is $>0.2°$ and is therefore comparable to the scan angle achievable with facet tracking acousto-optic modulators known in the art. Tilt angles of this magnitude might lead to concern about reflection losses at the tilted interfaces; however, the reflection losses of the tilted surfaces are minimized because of the geometry shown in FIG. 3. The transmission rate of the device is shown for both parallel and perpendicularly polarized light, $T_{\parallel}$ and $T_{\perp}$, respectively, and for the endpoints of the scan range. The transmission of the entrance and exit faces is assumed to be 100% for this model. It will be noted that the transmission is $>90\%$ in both cases for a 70° prism tilt.

Incorporation of the ferroelectric liquid crystal optical element of the present invention in a raster output scanning system of an electrographic printing apparatus can be achieved by various means. For example, bias voltage source 58 can be operatively associated with, and synchronized by the rotation of the rotating polygon 16, as shown illustratively in FIG. 1 by control line 62. An exemplary periodic ramp signal as shown in FIG. 3 is triggered at the beginning of each scan line having a period lasting the length of a scan line trace, typically on the order of 10 microseconds. Thus, the scan angle of the beam would be proportional to the voltage applied to optical element so that a simple voltage ramp between, for example, 0 Volts and 30 Volts would facilitate the facet tracking function. In this case, the submicrosecond response time of the ferroelectric liquid crystal material should be well within the requirements for deflecting the laser beam in conjunction with the rotating facet. Other feedback and control systems may also be contemplated, such as for example, a beam intensity measurement system as disclosed in U.S. Pat.

No. 4,342,050 wherein a peak responding circuit is provided so that an output tap permits the generation of a peak signal which can be used to drive the biasing source 58.

Figure 5:
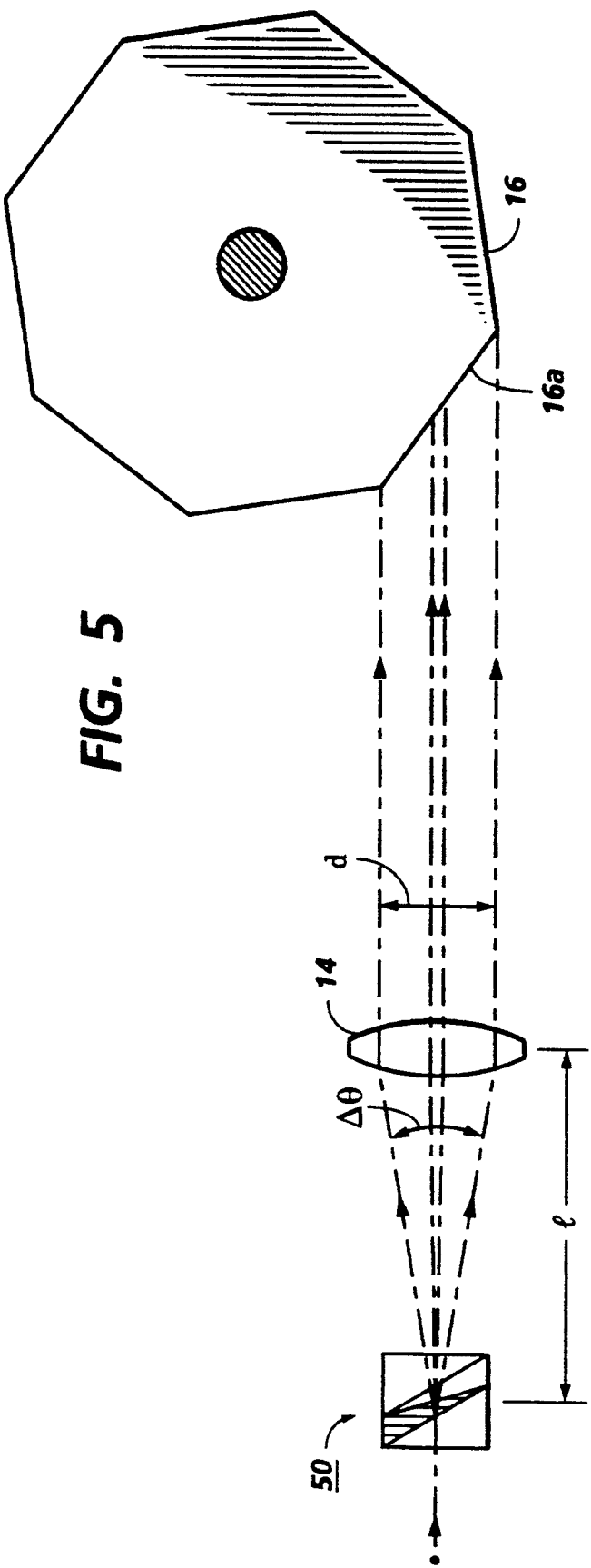
FIG. 5 shows a schematic view in a horizontal plane of a facet tracking ROS system utilizing the optical element of the present invention.

An illustrative arrangement for a raster output scanner incorporating the liquid crystal cell of the present invention for facet tracking purposes is shown in FIG. 5. This Figure illustrates that, in practice, a collimating lens 14 is typically interposed between the optical element 50 and the multi-faceted polygon 16. Thus, a diverging beam emitted from the optical element 50 is collimated by lens 14 for transmission to facet 16a. The scan angle required by optical element 50 is proportional to the dimensional relationship defined by the linear distance between the optical element 50 and the collimating lens 14, indicated by reference letter "l", relative to the lateral distance over which the scan beam tracks, called the linear tracking distance, indicated by reference letter "d". This relationship between these dimensions and the scan angle is defined by the following equation:

$$\tan\Delta\theta = d/l$$

Thus, in a typical configuration, d could be 0.5 cm, while l could be 150 cm such that $\tan\Delta\theta$ is $3.3 \times 10^{-3}$ radians, specifying a scan angle on the order of 0.20°.

Figure 6:
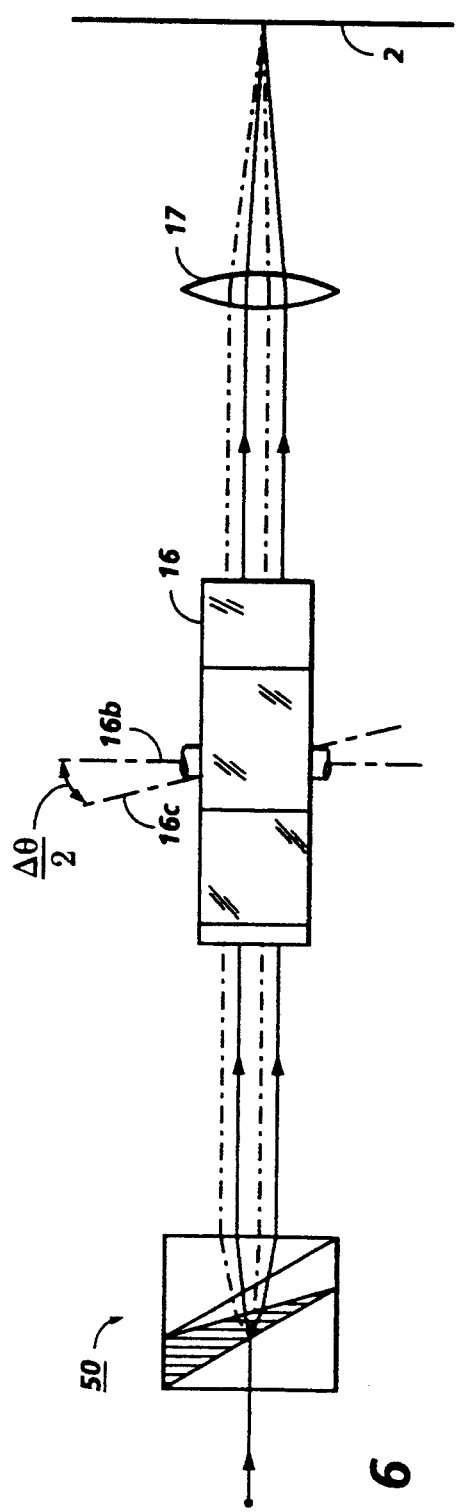
FIG. 6 shows a schematic view in a sagittal plane of a wobble correction ROS system utilizing the optical element of the present invention.

It will be understood by those of skill in the art that the electro-optical device of the present invention may also be used to provide electronic wobble correction in a raster output scanning system. That is, the angular scan range achievable with the present invention is also more than sufficient for compensation of alignment errors between adjacent facets of a scanning polygon. Thus, the optical element of the present invention could be used to deflect the laser beam in a direction perpendicular to the direction of rotation of the polygon as well as in a direction parallel to polygon rotation, as in the case of facet tracking. An exemplary configuration for wobble correction is illustrated in FIG. 6 where a polygon 16 is shown having an axis of rotation 16b and a facet tilt axis 16c (shown with exaggerated tilt). The facet tilt angle is defined by one-half of the deflection angle, $\Delta\theta/2$. Again, this Figure shows that, in practice, it is common to interpose a scan lens 17 into the post-scan optics of the ROS. Typical wobble correction of approximately 0.01° is sufficient in most electrostatographic applications.

Electronic wobble correction via the present invention might be implemented through the use of split diodes or detector arrays at the start-of-scan and end-of-scan locations on the imaging member as shown in phantom in FIG. 1. A closed loop control system implemented via a computational algorithm which, for example, might use Fourier transforms of the error signal to determine amplitude, phase and frequencies of the dynamic periodic errors in the scan line and then use this information in the form of a look-up table to provide the appropriate correction signal to the optical element 50. Such a control system could measure, anticipate, and correct for facet wobble occurring at frequencies lower than the inverse of a single scan line time. In addition, a second level of correction might sample points along the entire scan line whenever the laser is active by using a scan line length split diode to measure an error signal. The sample points obtained by this technique could further improve the accuracy of the correction and extend the corrections to higher frequencies. In yet another alternative scheme, wobble correction might be implemented through the use of a dual beam raster output scanner and a split diode wherein one of the beams from the dual beam raster output scanner is modulated with the video signal while a second, continuous beam would be diverted after the polygon to strike the split diode. In this case, a real time closed loop control system could be implemented by simply minimizing the error signal from the split diode such that no computational algorithms would be necessary. Various other control and feedback systems could also be used to incorporate corrections for facet transport motion variations.

Figure 7:
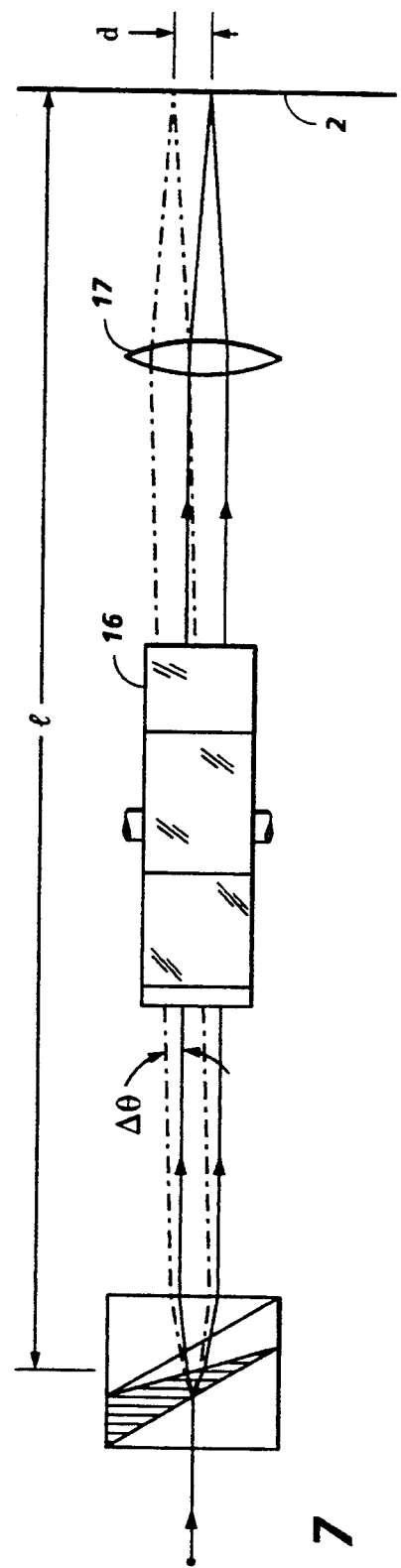
FIG. 7 shows a schematic view in a sagittal plane of a motion quality correction ROS system utilizing the optical element of the present invention.

The high speed tracking device and apparatus of the present invention can also be utilized to provide motion quality correction in the case of photoreceptor transport inconsistencies. An illustrative configuration for motion quality correction is shown in FIG. 7 wherein a light beam may be deflected for correcting line position to compensate for photoreceptor motion error. Thus, nominal scan line position can be shifted a distance d to properly position a scan line on the photoreceptor. In a typical system where the distance between the optical element and the photoreceptor, l, is equal to 0.25 m and the lateral dimension for shifting by one scan line, d, is equal to approximately 42 micrometers (assuming 600 lines per inch), a calculation of the scan angle is approximately 0.01°. This requirement is readily facilitated by the device of the present invention and can be implemented by monitoring the photoreceptor belt movement to detect motion errors and controlling the biasing source, as for example, via control line 60 shown in FIG. 1, in response to detected motion errors to provide motion quality correction.

In recapitulation, there has been a shown a device and apparatus for high speed tracking including facet tracking, wobble correction and motion quality correction in a raster output scanner of the type used, for example, in an electrostatographic machine. The present invention provides an electro-optic device having a variable refractive index in a configuration which facilitates deflection of a laser beam to provide precise angular displacement of the laser beam on the rotating facet in a direction parallel or perpendicular to the direction of rotation thereof. A control system used in combination with the optical element of the present invention may be adapted to monitor facet rotation, angular alignment errors in the rotating polygon, or scan line position errors on the photoreceptor for applying an appropriate voltage to the optical element to change the refractive index thereof, thereby shifting the position of the laser beam. A novel configuration of the optical element having a ferroelectric liquid crystal material contained in a chamber between a pair of parallel electrodes for providing the desired results is disclosed.

While the invention has been described with reference to the structure disclosed, it will be appreciated that numerous changes and modifications are likely to occur to those skilled in the art. The present invention is intended to cover all changes and modifications which fall within the true spirit and scope of the invention.

I claim:
1. An optical element, comprising:
    a member having a pair of parallel external surfaces, said member including a pair of prism elements positioned substantially adjacent one another to form a chamber interposed therebetween, wherein the chamber is provided with a wedge-shaped cross-section having a progressively decreasing width from one marginal region to another marginal region opposed therefrom; and a material having a variable index of refraction substantially filling the chamber of said member for selectively deflecting a light beam passing therethrough.

2. The optical element of claim 1, further including means for applying a biasing voltage across said member to vary the index of refraction of said material as a function of the applied biasing voltage.

3. The optical element of claim 2, further including a pair of electrodes, coupled to said biasing means, with the chamber being interposed therebetween.

4. The optical element of claim 3, wherein said electrodes are disposed substantially parallel to one another.

5. The optical element of claim 1, wherein said material includes a ferroelectric crystal material.

6. A raster output scanner adapted to illuminate a surface, comprising:

means for generating a light beam;

a rotatably mounted polygon positioned to receive the light beam, said polygon including a plurality of facets for reflecting the light beam onto the surface;

an optical element, interposed between said generating means and said polygon, said optical element including a member having a pair of parallel external surfaces, said member including a pair of prism elements positioned substantially adjacent one another to form a chamber interposed therebetween, wherein the chamber is provided with a wedge-shaped cross-section having a progressively decreasing width from one marginal region to another marginal region opposed therefrom; and a material having a variable index of refraction substantially filling the chamber of said member for selectively deflecting the light beam transmitted therethrough on a selected portion of each facet as said polygon rotates; and means for electrically biasing said optical element to deflect the light beam as a function of a biasing voltage applied to said optical element so as to position the light beam in the selected portion of each facet.

7. The raster output scanner of claim 6, wherein said material having a variable index of refraction includes a ferroelectric crystal material.

8. The raster output scanner of claim 6, wherein said optical element further includes first and second electrode members respectively positioned on opposite sides of the chamber, said electrodes being coupled to said biasing means for applying voltage across the chamber to produce uniform electric fields therethrough.

9. The raster output scanner of claim 8, wherein said electrode members are disposed substantially parallel to one another.

10. The raster output scanner of claim 6, including means for controlling said biasing means as a function of the rotation of said polygon so as to deflect the light beam onto the selected portion of each facet as said polygon rotates.

11. The raster output scanner of claim 10, wherein said biasing means provides a periodic ramp voltage.

12. The raster output scanner of claim 6, including:

means for detecting alignment errors between adjacent facets on the scanning polygon; and means, responsive to the alignment errors, for controlling the voltage source such that the selective deflection of the light beam provides wobble correction.

13. The raster output scanner of claim 6, including:

means for detecting motion errors in a moving belt;

means, responsive to the detected motion errors, for controlling the voltage source such that the selective deflection of the light beam provides motion quality correction.

14. An electrostatographic printing machine in which a raster output scanner produces a modulated light beam wherein the modulated light beam is scanned across a movable photoconductive surface by a rotatable scanning polygon having a plurality of facets for recording successive scan lines on the photoconductive surface, comprising:

an optical element, said optical element including a member having a pair of parallel external surfaces, said member including a pair of prism elements positioned substantially adjacent one another to form a chamber interposed therebetween, wherein the chamber is provided with a wedge-shaped cross-section having a progressively decreasing width from one marginal region to another marginal region opposed therefrom; and a material having a variable index of refraction substantially filling the chamber of said member for selectively deflecting the light beam on a selected portion of each facet as said polygon rotates to form a scan line; and a voltage source for applying a biasing voltage to said optical element to selectively deflect the light beam as a function of the biasing voltage applied to said optical element so as to maintain the light beam in the selected portion of each facet.

15. The electrostatographic printing machine of claim 14, wherein said material having a variable index of refraction includes a ferroelectric crystal material.

16. The electrostatographic printing machine of claim 14, wherein said optical element further includes first and second electrode members respectively positioned on opposite sides of the chamber, said electrodes being coupled to said biasing means for applying voltage across the chamber to produce uniform electric fields therethrough.

17. The electrostatographic printing machine of claim 16, wherein said electrode members are disposed substantially parallel to one another.

18. The electrostatographic printing machine of claim 14, including means for controlling the voltage source as a function of the rotation of said polygon so as to deflect the light beam onto the selected portion of each facet as said polygon rotates.

19. The electrostatographic printing machine of claim 18, wherein the voltage source provides a periodic ramp voltage.

20. The electrostatographic printing machine of claim 16, including:

means for detecting alignment errors between adjacent facets on the scanning polygon; and means, responsive to the alignment errors for controlling the voltage source such that the selective deflection of the light beam provides wobble correction.

21. The electrostatographic printing machine of claim 16, including:
   means for detecting motion errors in a moving belt;
   means, responsive to the detected motion errors, for controlling the voltage source such that the selective deflection of the light beam provides motion quality correction.

* * * * *